United States Patent
Chen

(10) Patent No.: US 7,055,025 B2
(45) Date of Patent: May 30, 2006

(54) SYSTEM AND METHOD FOR BOOT MODE CONTROL

(75) Inventor: Ching-Chuan Chen, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 473 days.

(21) Appl. No.: 10/350,461

(22) Filed: Jan. 24, 2003

(65) Prior Publication Data

US 2004/0098576 A1 May 20, 2004

(30) Foreign Application Priority Data

Nov. 14, 2002 (TW) ................................ 91133352 A

(51) Int. Cl.
 *G06F 9/00* (2006.01)
(52) U.S. Cl. ........................ 713/1; 713/300; 713/310; 713/323
(58) Field of Classification Search ................ 713/300, 713/310, 323, 1
See application file for complete search history.

(56) References Cited

U.S. PATENT DOCUMENTS

| | | | | |
|---|---|---|---|---|
| 5,856,789 A | * | 1/1999 | Huang | 713/300 |
| 6,496,927 B1 | * | 12/2002 | McGrane et al. | 713/1 |
| 6,545,668 B1 | * | 4/2003 | Hayama | 345/172 |
| 6,642,852 B1 | * | 11/2003 | Dresti et al. | 340/825.72 |
| 6,675,300 B1 | * | 1/2004 | Jung et al. | 713/200 |
| 6,898,765 B1 | * | 5/2005 | Matthews et al. | 715/815 |

FOREIGN PATENT DOCUMENTS

| | | |
|---|---|---|
| JP | 3056291 | 11/1998 |
| JP | 2001-034393 | 9/2001 |
| JP | 2002-091634 | 3/2002 |

* cited by examiner

*Primary Examiner*—Chun Cao
*Assistant Examiner*—Vincent Tran
(74) *Attorney, Agent, or Firm*—Quintero Law Office

(57) ABSTRACT

A system for boot mode control using analysis of power state and system mode. The system includes an input unit, a system power state pin, and a keyboard encoder. The system power state pin records the power state of a computer system. The keyboard encoder receives a function signal from the input unit, checks the system power state pin and the system mode of the computer system, and attempts validation of the function signal according to the system power state pin and system mode of the computer system.

19 Claims, 3 Drawing Sheets

SYSTEM AND METHOD FOR BOOT MODE CONTROL

BACKGROUND OF THE INVENTION

1. Field of the Invention

The present invention relates to a system and method for boot mode control, and particularly to a system and method for boot mode control that controls the boot mode of a computer system by a keyboard encoder according to the power state and system mode.

2. Description of the Related Art

Most computer systems can integrate practical appliances or functions, for example, CD/MP3 and VCD/DVD player, and TV function can also be integrated. Users can use a remote controller to select and operate specific appliances or functions. The computer system can operate in two modes, AV and PC. The computer system can operate normally in PC mode, and operate as Audio/MP3/VCD/DVD/TV players in the AV mode.

When in the PC mode, the operating system (OS) can define functions of corresponding keys for respective applications. If users perform incorrect operations, desired functionality can be negatively affected.

When in an off state, the computer system is powered up by the power button. Mode switch controls cannot perform this operation. However, as users often wish to use only one control to enable related appliances without PC functionality, the conventional boot mode is not convenient.

SUMMARY OP THE INVENTION

It is therefore an object of the present invention to provide a system and method for boot mode control by a keyboard encoder according to the power state and system mode, to provide convenient operation of computer systems and prevent system failure from incorrect operation.

To achieve the above object, the present invention provides a system and method for boot mode control using analysis of power state and system mode. According to an embodiment of the invention, the system includes an input unit, a system power state pin, and a keyboard encoder.

The system power state pin records the power state of the computer system. The keyboard encoder receives a function signal from the input unit, checks the system power state pin and the system mode of the computer system, and attempts validation of the function signal according to the system power state pin and system mode of the computer system.

According to another embodiment of the invention, a method for boot mode control using analysis of power state and system mode is provided. First, a system power state pin reports the power state of a computer system. Then, a function signal from an input unit is received by a keyboard encoder. Thereafter, the power state is acquired by checking the system power state pin, and the system mode of the computer system is checked. Finally, the function signal is checked for validation according to the power state and system mode of the computer system.

When the system is in a power on state, it is in AV mode, and the function signal corresponds to the mode switch key or function key of the AV mode, the function signal is validated by the keyboard encoder. Further, when the system is in a powered off state or in standby state, the function signal corresponds to the mode switch key or power button, it is validated by the keyboard encoder.

If the function signal corresponds to the mode switch key, the keyboard encoder enables the computer system to turn on and operate in the system mode specified by the mode switch key. If the function signal corresponds to the power button, the keyboard encoder enables the computer system to turn on and operate in a prior system mode recorded in the keyboard encoder.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
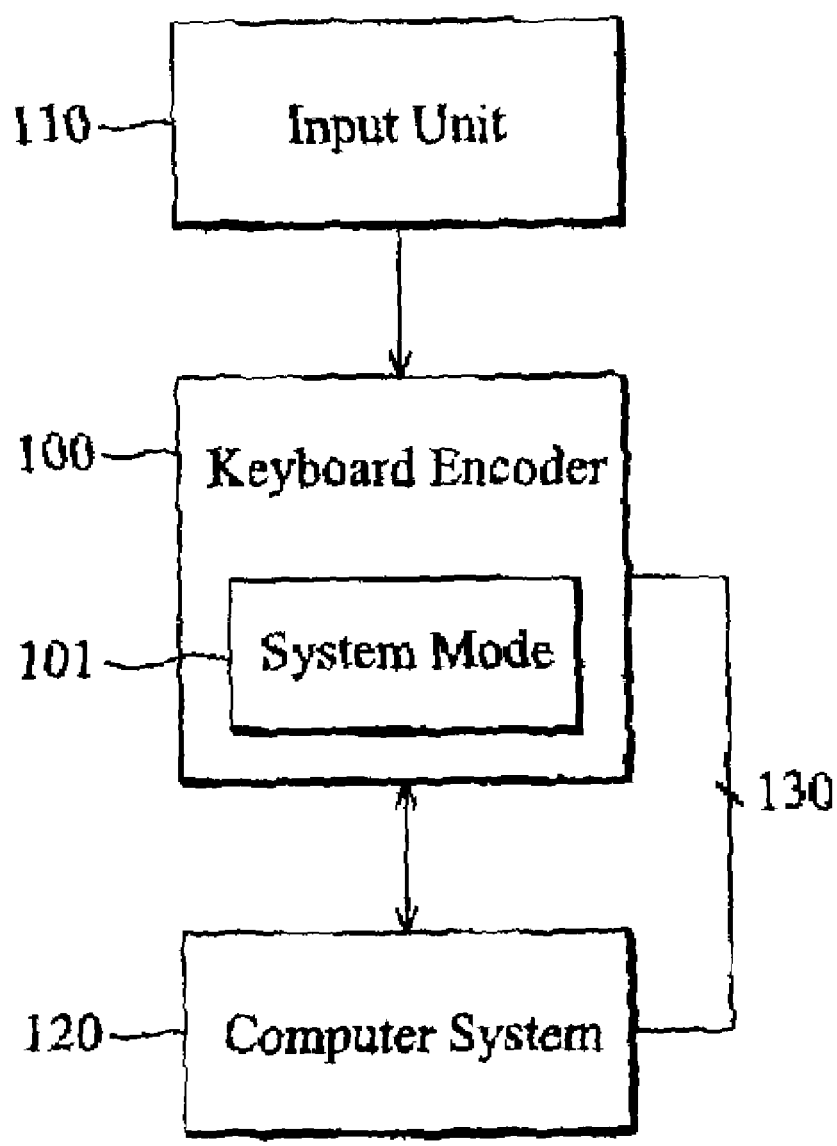
FIG. 1 is a schematic diagram showing the architecture of the system for boot mode control using analysis of power state and system mode according to the embodiment of the present invention.

FIG. 1 shows the architecture of the system for boot mode control using analysis of power state and system mode according to the embodiment of the present invention.

The system includes a keyboard encoder 100, an input unit 110, a computer system 120, and a system power state pin 130.

The keyboard encoder 100 receives signals (function signals) from the input unit 110, and attempts validation of the signals, determined whether to transmit the signals to the computer system 120. The input unit 110 can be a remote controller or keyboard. The system power state pin 130 can comprise hardware signals to record the power state of the computer system 120, such as power on, power off, and standby states.

The keyboard encoder 100 can check the system power state pin 130 and the system mode 101 of the computer system 120, determine if the signal is suitable for use in the current system mode, that is to attempt validation, and define related operations. It should be noted that both the current system mode of the computer system 120 and the system mode before the computer system 120 is turned off can be recorded in the keyboard encoder 100.

Figure 2:
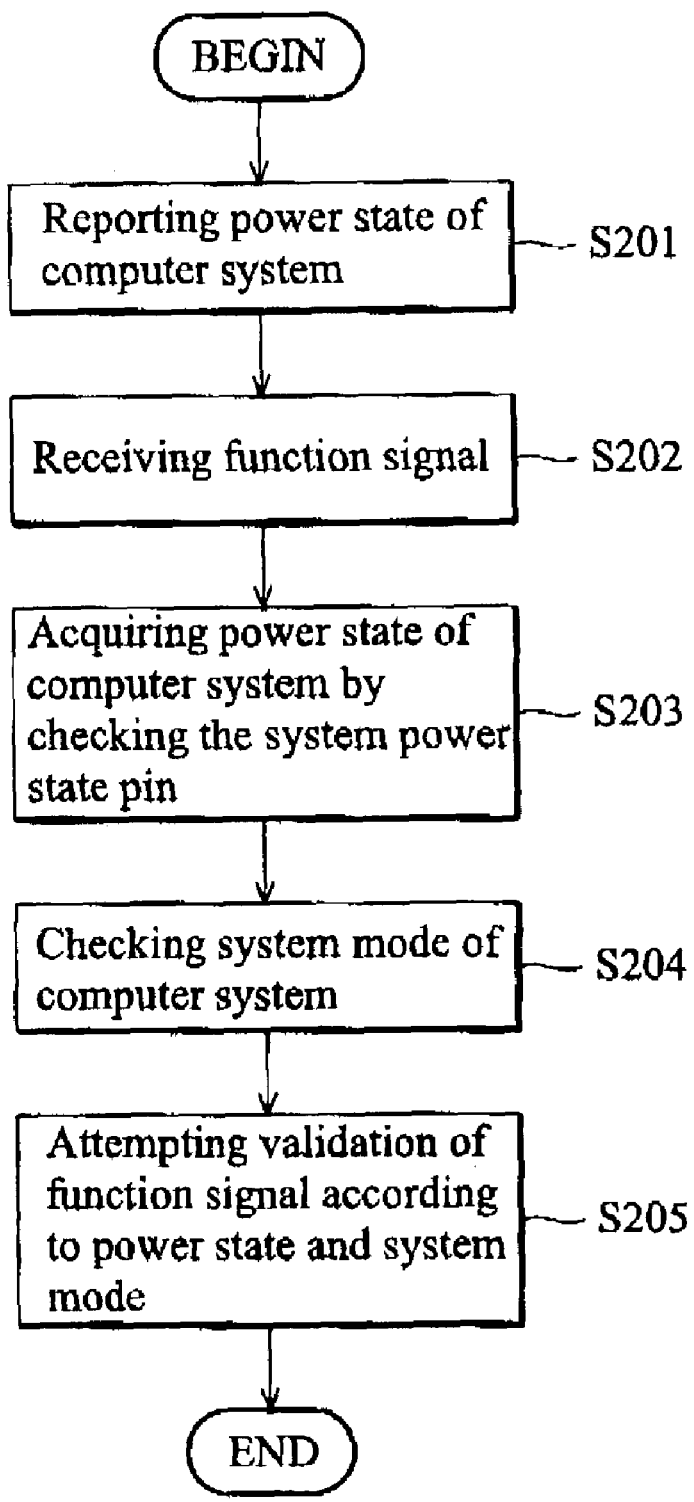
FIG. 2 is a flowchart illustrating the operation of the method for boot mode control using analysis of power state and system mode according to the embodiment of the present invention.

FIG. 2 illustrates the operation of the method for boot mode control using analysis of power state and system mode according to the embodiment of the present invention.

First, in step S201, a system power state pin 130 reports the power state of the computer system 120. Then, in step S202, a function signal from the input unit 110 is received by the keyboard encoder 100.

Thereafter, in step S203, the power state of the computer system 120 is acquired by checking the system power state pin 130, and in step S204, the system mode 101 of the computer system 120 is checked. Finally, in step S205, the function signal is checked for validation according to the power state and system mode 101 of the computer system by the keyboard encoder 100.

Figure 3:
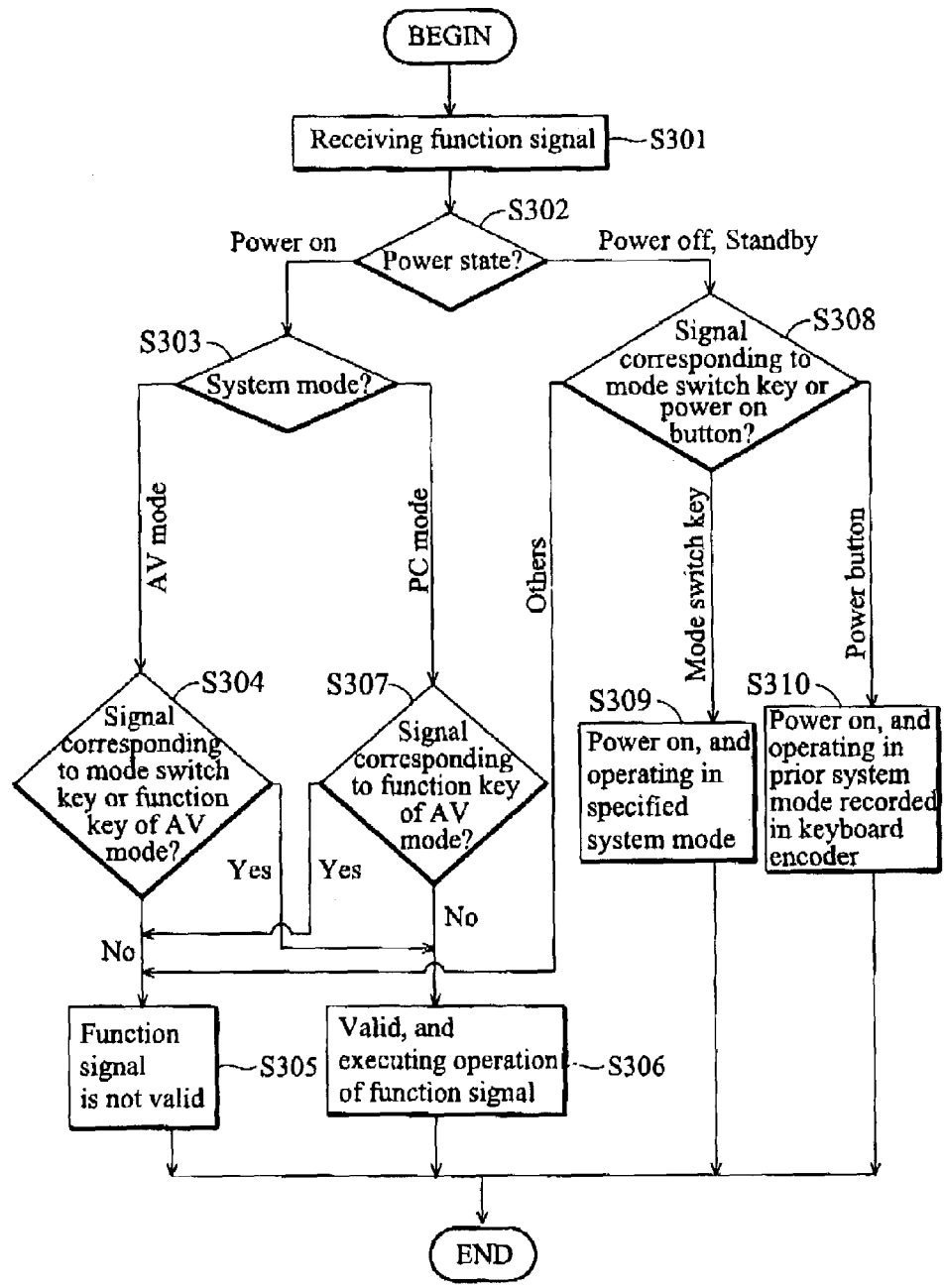
FIG. 3 is a flowchart illustrating the operation of the method for function signal determination according to the embodiment of the present invention.

FIG. 3 illustrates the operation of the method for function signal determination according to the embodiment of the present invention.

First, in step S301, the function signal from the input unit 110 is received. Then, in step S302, the power state of the computer system 120 is checked.

If the system is in power on state, in step S303, the current system mode of the computer system 120 is checked. If the system is in AV mode, in step S304, the function signal is checked for correspondence to the mode switch key or function key of the AV mode. If not, in step S305, the keyboard encoder 100 cannot validate the function signal, and the operation corresponding to the function signal is not executed. If yes, in step S306, the keyboard encoder 100 validates the function signal, and the operation corresponding to the function signal is executed and/or the function signal is forwarded to the computer system 120.

For example, only the mode switch key and the function keys of the audio mode are valid if the system is in power on state and in audio mode; only the mode switch key and the function keys of the MP3 mode are valid it the system is in power on state and in MP3 mode; and only the mode switch key and the function keys of the TV mode are valid if the system is in power on state and in TV mode.

If the system is in power on state and the computer system 120 is in PC mode, in step S307, the function signal is checked for correspondence to the function key of the AV mode. If yes, in step S305, the keyboard encoder 100 cannot validate the function signal, and the operation corresponding to the function signal is not executed. If no, in step S306, the keyboard encoder 100 validates the function signal, and the operation corresponding to the function signal is executed and/or the function signal is forwarded to the computer system 120.

In addition, if the system is in a powered off state or in standby state, in step S308, the function signal is checked for correspondence to the mode switch key or the power button. If the function signal corresponds to the mode switch key, in step S309, the keyboard encoder 100 enables the computer system 120 to turn on and operate in the mode specified by the mode switch key. If the function signal corresponds to the power button, in step S310, the keyboard encoder 100 enables the computer system 120 to power up (wake) and operate in the prior system mode recorded previously in the keyboard encoder 100.

As a result, the system and method for boot mode control using analysis of power state and system mode according to the present invention provide convenient operation of computer systems and prevent system failure due to incorrect operation.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for boot mode control using analysis of power state and system mode, comprising:
    an input unit to send a function signal;
    a system power state pin to report a power state of a computer system; and
    a keyboard encoder to receive the function signal from the input unit, check the system power state pin and a system mode of the computer system, and attempt validation of the function signal according to the system power state pin and system mode of the computer system;
    wherein the keyboard encoder validates the function signal if the system is in a powered down state or in standby state and the function signal corresponds to a mode switch key or a power button; and
    the keyboard encoder enables the computer system to turn on and operate in a prior system mode recorded in the keyboard encoder if the function signal corresponds to the power button.

2. The system as claimed in claim 1 wherein the keyboard encoder validates the function signal if the system is in power on state and in AV mode, and the function signal corresponds to a mode switch key or a function key of AV mode.

3. The system as claimed in claim 1 wherein the keyboard encoder cannot validate the function signal if the system is in power on state and in PC mode, and the function signal corresponds to a function key of AV mode.

4. The system as claimed in claim 1 wherein the keyboard encoder enables the computer system to turn on and operate in the system mode specified by the mode switch key if the function signal corresponds to the mode switch key.

5. The system as claimed in claim 1 wherein the input unit is a keyboard.

6. The system as claimed in claim 1 wherein the input unit is a remote controller.

7. A method for boot mode control using analysis of power state and system mode, comprising the steps of:
    reporting of a power state of a computer system by a system power state pin;
    reception of a function signal from an input unit by a keyboard encoder;
    checking the system power state pin to acquire the power state;
    checking a system mode of the computer system;
    attempting validation of the function signal according to the power state and the system mode of the computer system; and
    invalidating the function signal by the keyboard encoder if the system is in power on state and in PC mode, and the function signal corresponds to a function key of AV mode.

8. The method as claimed in claim 7 further comprising validation of the function signal by the keyboard encoder if the system is in power on state and in AV mode, and the function signal corresponds to a mode switch key or a function key of AV mode.

9. The method as claimed in claim 7 further comprising validation of the function signal by the keyboard encoder if the system is in a powered down state or in standby state and the function signal corresponds to a mode switch key or a power button.

10. The method as claimed in claim 9 further comprising enabling the computer system to turn on and operate in the system mode specified by the mode switch key by the keyboard encoder if the function signal corresponds to the mode switch key.

11. The method as claimed in claim 9 further comprising the keyboard encoder enabling the computer system to turn on and operate in a prior system mode recorded therein if the function signal corresponds to the power button.

12. The method as claimed in claim 7 wherein the input unit is a keyboard.

13. The method as claimed in claim 7 wherein the input unit is a remote controller.

14. A method for boot mode control using analysis of power state and system mode, comprising the steps of:
- reporting of a power state of a computer system by a system power state pin;
- reception of a function signal from an input unit by a keyboard encoder;
- checking the system power state pin to acquire the power state;
- checking a system mode of the computer system;
- attempting validation of the function signal according to the power state and the system mode of the computer system;
- validating of the function signal by the keyboard encoder if the system is in a powered down state or in standby state and the function signal corresponds to a mode switch key or a power button; and
- enabling the computer system to turn on and operate in a prior system mode recorded therein by the keyboard controller if the function signal corresponds to the power button.

15. The method as claimed in claim 14 further comprising validation of the function signal by the keyboard encoder if the system is in power on state and in AV mode, and the function signal corresponds to a mode switch key or a function key of AV mode.

16. The method as claimed in claim 14 further comprising enabling the computer system to turn on and operate in the system mode specified by the mode switch key by the keyboard encoder if the function signal corresponds to the mode switch key.

17. The method as claimed in claim 14 wherein the input unit is a keyboard.

18. The method as claimed in claim 14 wherein the input unit is a remote controller.

19. The method as claimed in claim 14 further comprising no validation of the function signal by the keyboard encoder if the system is in power on state and in PC mode, and the function signal corresponds to a function key of AV mode.

* * * * *